No. 675,587. Patented June 4, 1901.
W. J. BUCKLEY.
SECONDARY BATTERY.
(Application filed Feb. 2, 1900. Renewed Apr. 29, 1901.)
(No Model.)
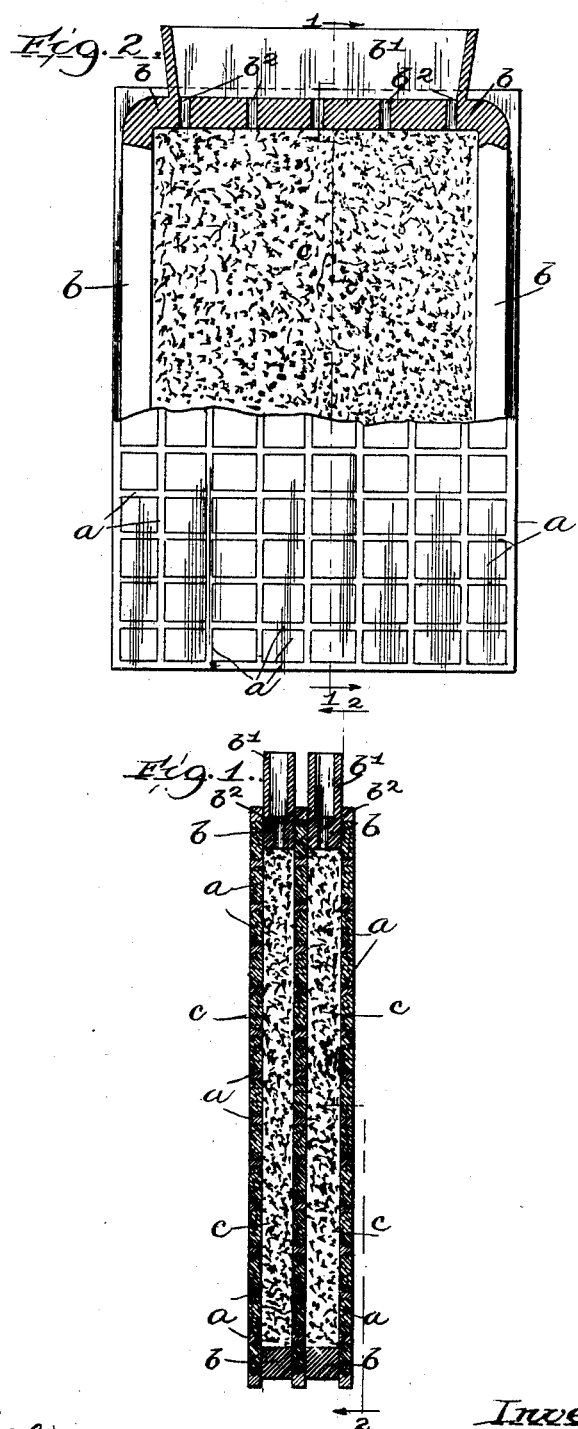

UNITED STATES PATENT OFFICE.

WILLIAM J. BUCKLEY, OF CHICAGO, ILLINOIS.

SECONDARY BATTERY.

SPECIFICATION forming part of Letters Patent No. 675,587, dated June 4, 1901.

Application filed February 2, 1900. Renewed April 29, 1901. Serial No. 58,006. (No model.)

*To all whom it may concern:*

Be it known that I, WILLIAM J. BUCKLEY, a citizen of the United States, residing at Chicago, county of Cook, and State of Illinois, have invented certain new and useful Improvements in Storage Batteries; and I do hereby declare the following to be a full, clear, and exact description of the invention, such as will enable persons skilled in the art to which it appertains to make and use the same.

My invention relates to improvements in storage batteries.

One object of my invention is to provide a battery that has a low internal resistance that will maintain a practically constant difference of potential between its terminals under all conditions and one wherein polarization caused by the evolution of gases at the electrodes by their affinity for the plates is practically, if not wholly, eliminated.

A further object of my invention is to produce a very durable battery wherein every particle of the active material is positively held in place in the grids by the action of the separator and by the same construction the plates or girds are prevented from buckling.

In the drawings, Figure 1 is a section through several assembled plates and the intervening separators and charcoal filler. Fig. 2 is an end elevation of a plate with a separator in place, showing the carbon filler and separator broken away.

The same letters of reference indicate similar parts in both figures.

Any flat plate or grid having a solid sheet-metal core or otherwise being made liquid-tight and provided with a continuous metal band around its edges will answer for my battery when I desire to provide a separate electrolyte between each pair of plates, and thereby include them in serial circuit; but when the battery-plates are intended to be placed in a cell having an electrolyte common to all of the plates, as when the plates are connected in parallel circuit, then the liquid-tight quality of the plates is not essential.

A plate such as described is represented by $a$. A separator $b$ I make of any material that will resist the action of the electrolyte and will provide a space between the plates, into which space the granular carbon may be placed. When the plates are placed in parallel circuit in an electrolyte, it is preferable to have the separator made of a porous material or to have perforations made therein. When the plates are to be placed in serial circuit, it is necessary that the separator shall be made of a liquid-tight material and preferably of a material of a soft yielding nature. It is further required that a reservoir for containing a surplus quantity of the electrolyte shall be provided above the plate for supplying any deficiency that might otherwise from time to time exist. I prefer to make this reservoir an integral part of the separator.

$b'$ represents thin walls rising above the separator providing a pocket-like reservoir, the bottom of which forms the top surface of the frame $b$. The frame $b$ may be perforated with a number of holes $b^2$ to permit the liquid contained in the reservoir to enter the space between the plates $a$. This reservoir may be covered at the top, or it may be made with an immovable integral top provided with a perforation for the purpose of filling.

$c$ represents powdered or granular carbon, such as wood-charcoal, which I have found well adapted for this use. It is gently tamped in between the plates, preferably after they have been properly formed.

In the operation of a storage battery, either when it is being charged or discharged, there is evolved at the electrodes a considerable quantity of gas, principally hydrogen. The electrodes or plates have a great affinity for this gas, and it has been observed that it (the gas) adheres to the surfaces of the plates in globules until a very great portion of the surface of the plate is thus covered, and being thus covered by so high an insulator as the aforesaid gas that portion of the plate so covered is shielded from the action of the electrolyte. The result is that the surface of the plate being thus reduced the internal resistance of the battery for that reason is increased, and the difference of potential between its terminals decreases. In other words, its voltage drops. After the battery has had a rest or after the gas has lifted from the surface of the electrodes, which it will do in the course of time, then the voltage rises again.

I have found that the charcoal which I use as a separator has the quality of absorbing gases to a degree many times greater than its own bulk. One cubic inch of charcoal has the capacity to absorb ninety cubic inches of hydrogen. The gas will be readily absorbed as fast as it is evolved, because the carbon has a greater affinity for it than the other elements of the battery. It is true that charcoal is to some extent an electric conductor, and it is also true that there is a natural electrical potential difference between the carbon and the metallic electrodes. These conditions may produce a slight local action in the cell; but the benefit derived from the use of the charcoal overbalances the very small objection described.

I do not know at this time of any other material that may be used in place of carbon which has all of the necessary characteristics of carbon; but I do not desire it to be understood that I limit myself to the use of carbon, as other materials may be found that will answer equally as well.

Having described my invention, what I claim as new, and desire to secure by Letters Patent of the United States, is—

A battery provided with a series of cells, each cell having two electrodes, or plates, a liquid-tight frame around the edges of said plates, a liquid-reservoir for each cell above its respective frame, and a filling of loose granular carbon between said plates, substantially as set forth.

WILLIAM J. BUCKLEY.

Witnesses:
 FORÉE BAIN,
 M. F. ALLEN.